United States Patent [19]

Wössner

[11] Patent Number: 4,493,231
[45] Date of Patent: Jan. 15, 1985

[54] METHOD AND DEVICE FOR MACHINING BRAKE DISKS

[76] Inventor: Hans Wössner, Aldinger Str. 96, Stuttgart-50, D-7000, Fed. Rep. of Germany

[21] Appl. No.: 396,907

[22] PCT Filed: Nov. 7, 1981

[86] PCT No.: PCT/DE81/00194
§ 371 Date: Jul. 6, 1982
§ 102(e) Date: Jul. 6, 1982

[87] PCT Pub. No.: WO82/01678
PCT Pub. Date: May 27, 1982

[30] Foreign Application Priority Data
Nov. 13, 1980 [DE] Fed. Rep. of Germany ... 8030325[U]

[51] Int. Cl.³ .......................... B23B 3/22; B23B 5/04; B23B 19/02
[52] U.S. Cl. ........................................ 82/4 A; 82/28 B
[58] Field of Search ........................ 82/4 A, 3, 28 R

[56] References Cited

U.S. PATENT DOCUMENTS 2,551,331  5/1951  Miller .................................. 82/28
3,592,088  7/1971  Welling ............................... 82/4 A
3,691,880  9/1972  Ratteree et al. ..................... 82/4 A
4,226,146  10/1980 Ekman ................................ 82/4 A
4,388,846  6/1983  Kopeko et al. ...................... 82/4 A

FOREIGN PATENT DOCUMENTS 2540187  3/1977  Fed. Rep. of Germany ....... 82/4 A
2745111  4/1979  Fed. Rep. of Germany ....... 82/4 A
2804840  8/1979  Fed. Rep. of Germany ....... 82/4 A Primary Examiner—Francis S. Husar
Assistant Examiner—William E. Terrell
Attorney, Agent, or Firm—Steele, Gould & Fried

[57] ABSTRACT

The refacing of worn brake disks of vehicles is carried out on the vehicle itself by connecting an outer drive with the disk (27) or with the shaft (42) on which the disk is mounted. This provides for the correct positioning of the machining tools (20, 21) with respect to the disk (27) allowing to effect the refacing on the vehicle (40). Two adjustable tools (20, 21) fixed on a common transverse carriage (16) machine simultaneously two faces of the disk (27). Coupling and centering devices (24) are arranged on either side of the refacing device (5) and may be coupled consecutively with the disk on the two sides of the vehicle.

11 Claims, 3 Drawing Figures

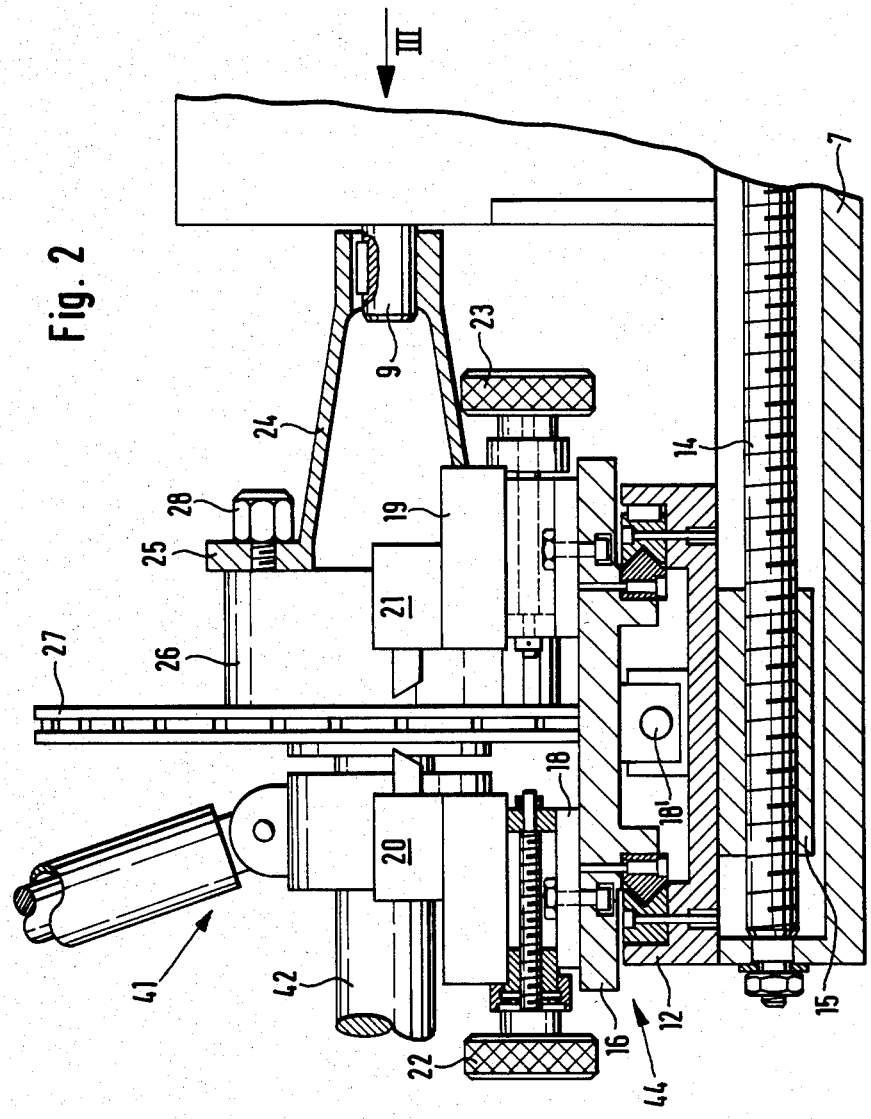

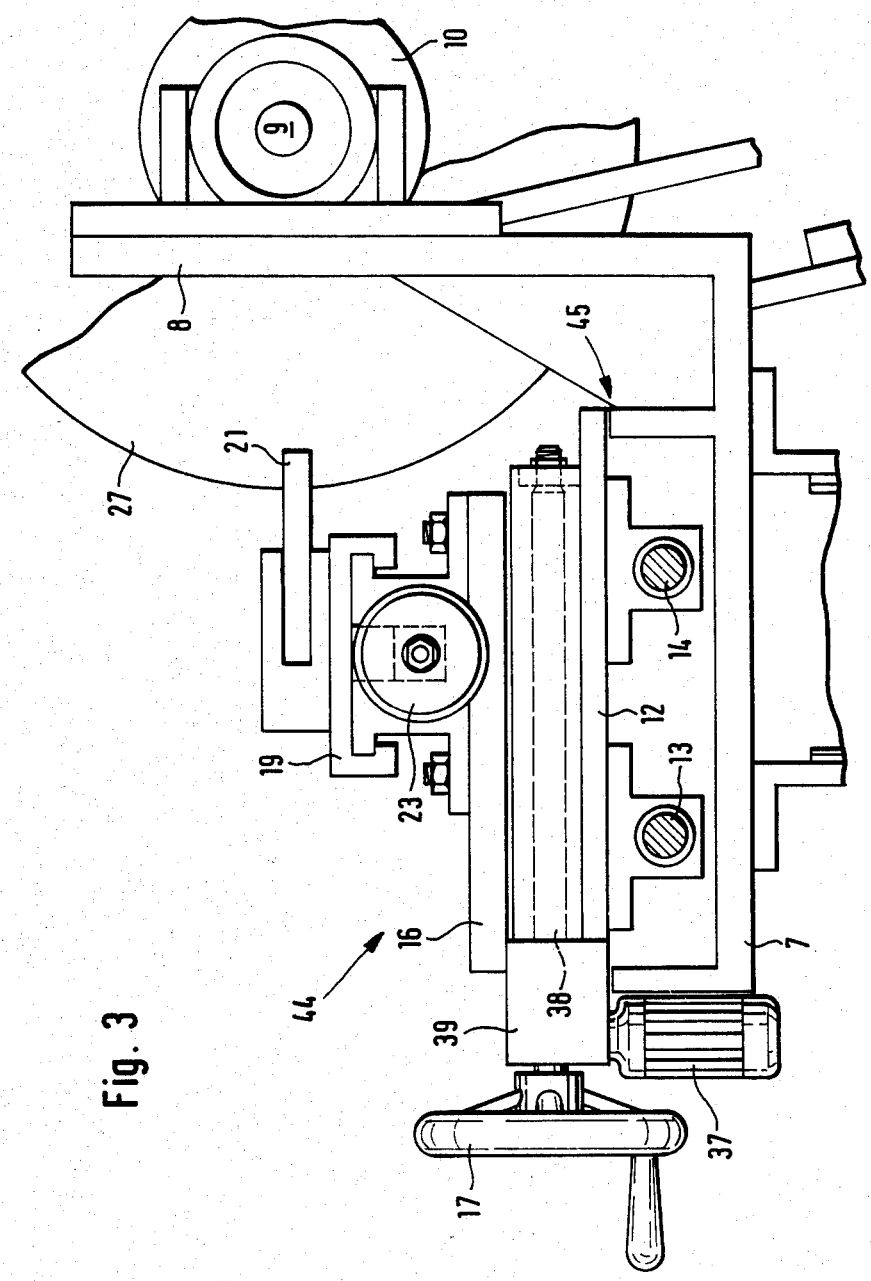

METHOD AND DEVICE FOR MACHINING BRAKE DISKS

The invention relates to a method and a device for machining worn brake disks of vehicles, particularly motor vehicles.

Wear or external actions during the use of vehicle brake disks can lead to surface damage, e.g. grooves or marks, long before the disk has been completely worn out. Since in particular internally ventilated brake disks have a considerable value, refacing is economically preferable to replacement if refacing costs can be kept low. Hitherto, brake disks have been dismantled for refacing in vehicle workshops, then mounted and turned on a machining machine, for example a lathe. In order to ensure adequate surface quality, flatness and plane parallelism, this work had to be carried out by trained personnel.

The object of the invention is to provide a method and a device enabling the machining of worn brake disks with low expenditure of both time and costs and giving good results.

According to the invention, this object is achieved by a method in which a separate drive is coupled to the vehicle axle or boss to which the brake disk is fixed and a machining tool is aligned with the vehicle axle. The brake disk fitted to the vehicle is moved relative thereto, and machined.

The device according to the invention can be constructed as a mobile device and has at least one coupling and centering device for connection to the vehicle wheel hub or shaft. Thus, with the vehicle jacked up, it is only necessary to remove the wheel and optionally the brake saddle with the brake linings, couple the device and start it up. The brake disk is then machined while installed, which saves time and costs in connection with the disassembly of the brake disk. It also excludes any possibility of errors in the precise true running of the machined brake disk, because the latter is machined in the fitted state. Thus, the device can be successively moved up to all four wheels of a vehicle, preferably by means of a chassis to which the device is fitted in such a way that its height and slope can be adjusted. The slope is adjustable to the axial slope of the vehicle with respect to the horizontal, i.e. about a pivot axis at right angles to the drive axis, and preferably also about a pivot axis parallel to the drive axis, so that the tools can be brought into a desired radial position of the brake disk if e.g. the latter is only freely accessible in a given position through a cutout in a cover plate. The only freely accessible area is normally in front of the axle and level therewith or at a certain angle of inclination thereto. To avoid rechucking of the tools during the refacing of the brake disks on the different sides of the vehicle, the rotary drive preferably has two oppositely directed coupling and centering devices or connections for the same, which are preferably driven in the same rotation direction and positioned at two ends of a drive shaft. The tool carrier is then moved between two working positions belonging in each case to one of the coupling and centering devices, so that there is no need to duplicate the tool carrier.

Although it would be possible to separately realise the rotary drive for the wheel axle and for centering the device ensuring the alignment of the tools and the movement direction thereof, particular preference is given to the coupling and centering device being a component which simultaneously transmits the rotary drive and aligns the device with respect to the wheel axle and it is advantageously a boss with screw connection possibilities for different wheel hubs.

A particularly preferred basic construction is obtained if the device has an elongated base part with a mounting support for a drive shaft arranged approximately centrally thereto with connections on both sides for the coupling and centering device, whilst in the longitudinal direction of the base part a guide for the tool carrier extends past the mounting support on one side.

For refacing the brake disk, the planar drive is preferably electromotively operable in a radially outwardly directed direction with respect thereto, which obviates surface unevennesses during manual operation by untrained personnel and the possibility of the tools moving into the wheel hub which would be possible on operation from the outside towards the inside.

Preferably, two tool holders for two tools are provided on the tool carrier having in each case their own infeed drive and preferably a common planar drive moving the tools at right angles to the axial direction of the brake disk. On the one hand this facilitates the setting of the two tools on the brake disk and on the other ensures absolute plane parallelism in one operation during refacing. The tools are normally constituted by turning tools. However, it would also be possible to use grinding wheels or other grinding or cutting means.

Thus, the invention permits the in situ returning of the brake disks. As it is very rare for a brake disk to be completely unusable and unmachinable, this may be able to obviate the need for an expensive stock of spares, whilst permitting the carrying out of such work in workshops for different vehicle makes.

The invention is described in greater detail hereinafter relative to an embodiment and the attached drawings, wherein:

FIG. 2 is a part sectional detail enlarged compared with FIG. 1.

FIG. 3 is a partial view in the direction of arrow III in FIG. 2.

Figure 1:
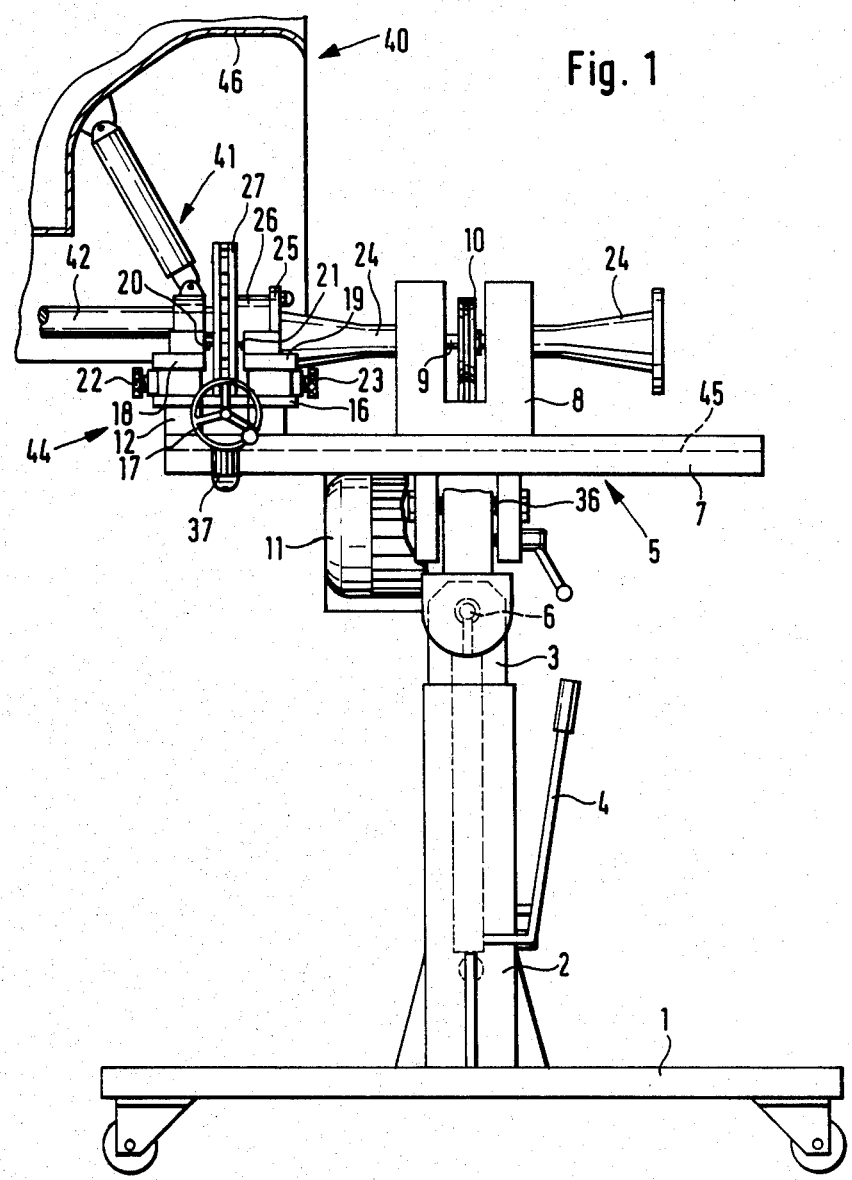
FIG. 1 is a side view of the device.

To a chassis 1 with wheels is fixed a vertical column 2 in which is vertically displaceably guided a carrier 3, whose height position can be adjusted by means of a pressure mechanism housed within column 2 and operable by a lever 4. A refacing device 5 is fixed to the upper end of carrier 3 so as to be pivotable about a horizontal pin or shaft 6 and a further pin or shaft 36 which is at right angles thereto. The refacing device comprises as the base part a longitudinal carrier 7 in whose centre is fixed a mounting support 8 in the manner of a headstock, in which is rotatably mounted a drive shaft 9 in the manner of a lathe spindle. The drive shaft 9 is provided within mounting support 8 with a V-belt pulley 10 driven in rotary manner by means of V-belts by an electric motor 11 located below longitudinal carrier 7. On carrier 7 a tool carrier 44 is guided on a guide 45 containing a slide 12, displaceable and optionally fixable by means of two threaded spindles 13, 14 in the longitudinal direction of carrier 7. A transverse carriage 16 is displaceable at right angles to the longitudinal direction of longitudinal carrier 7 (at right angles to the drawing plane of FIG. 1) on slide 12 by means of a spindle 38 mounted on the latter. Spindle 38 can be driven manually by a handwheel 17 and automatically by an electrical servomotor 37 via a gear box 39. On a guide, transverse carriage 16 carries two tool holders 18, 19, to which can be fixed tools 20, 21. Tool holders 18, 19 are adjustable parallel to the drive shaft 9 by means of control knobs 22, 23.

Coupling and centering devices 24 in the form of bosses are provided at the ends of drive shaft 9 and each end of the bosses remote from the shaft 9 is provided with a flange 25 connected to a wheel hub 26 of a vehicle axle 42 of a vehicle 40. FIG. 2 only shows parts of a wheel suspension 41, whilst FIG. 1 additionally shows certain body parts 46. The coupling function is fulfilled by screw bolts or wheel nuts 28 normally used for fixing the rim of the vehicle wheel to the wheel hub 26. Wheel hub 26 connected to the vehicle axle 42 carries the brake disk 27 which is to be refaced.

The means shown in FIG. 1 is moved up to a vehicle 40 jacked up on a lifting platform and on whose axle 42 is located the brake disk 27 to be refaced. The appropriate wheel has been removed and preferably the brake saddle has been dismantled. Drive shaft 9 is adjusted in the direction of the wheel axle 42 by means of the lifting device and the slope adjustment possibility about shaft 6. If necessary, the tool carrier 44, by pivoting about shaft 36 is brought into a position in which it can operate unimpeded by body parts, cover plates, etc. The device is then coupled to the wheel hub in that boss 24 of the drive shaft is screwed to hub 26 by means of its flange 25. This is simultaneously accompanied by coupling of the rotary drive and centering of the refacing device 5, with respect to the vehicle axle and consequently the brake disk 27.

Slide 12 is then moved into the position shown in FIG. 1 in which it is located approximately in the central position relative to the central plane of the brake disk 27 and is fixed in this position. By means of handwheel 17 transverse carriage 16 is moved in such a way that tools 20, 21 are located at the radially inner end of the ring surface of brake disk 27 to be refaced. The two tools 20, 21, e.g. turning tools or rotating or oscillating grinding wheels, are then moved by means of knobs 22, 23 in the direction of the drive shaft until they have the desired position for the refacing of brake disk 27. Motors 11 and 37 are now switched on and consequently disk 27 is rotated. By the displacement of transverse carriage 16, tools 20, 21 are jointly radially outwardly moved until the turning refacing process is at an end and the tools pass outwards out of the ring surface. Motors 11, 37 are now switched off and the connection between flange 25 and wheel hub 26 is broken. For machining a facing wheel, the tool carrier is moved to the other end of the longitudinal carrier 7 by moving slide 12 along guide 15. For connecting the opposite boss to the wheel axle corresponding adjustment of the slope takes place, followed by the actual coupling. Normally, a boss 24 is provided on either side of the mounting support 8, although conversion would be possible in the case e.g. of a special boss for a rare rim fixture.

The invention is not limited to the represented and described embodiment and numerous variants are possible thereto without passing beyond the scope of the invention. Thus, for example, flange 25 has a plurality of boring rims, so that it can be used for all existing wheel hub types. Boss 24 which has to be fixed to the wheel hub 26 by means of wheel nuts or screws can also be replaced by some other centering and coupling device, e.g. a clamping device working with grippers. The chassis is mainly intended for transporting the device to the fitting point and for supporting the same during fitting, as well as optionally for weight relief during refacing. However, during refacing, the wheel shaft fulfils the centering function and at least partly carries the device weight. Thus, it would be advantageous to use a chassis permitting a work-free upward and downward movement of the device, e.g. by means of a column with a weight-compensating gas spring cylinder or by means of counterbalancing cables and counterweights. In addition, shafts 6 and 36 could be replaced by a freely pivotable universal joint, for example a ball joint and/or the chassis with a column could be replaced e.g. by a mounting support fitted to the lifting platform or to the actual vehicle.

I claim:

1. An apparatus for refacing a worn brake disk of a vehicle, the disk being fixed on an axle of said vehicle, the axle also having a wheel hub fixed thereto, the axle being resiliently mounted on a body of said vehicle, the apparatus comprising:
    at least one refacing tool;
    a displaceable tool carrier mounted on a longitudinal carrier for movably positioning the tool with respect to the disk;
    a rotary drive means having a drive shaft for turning said axle; and,
    a mounting means for supporting the tool, tool carrier and drive relative to said axle, the mounting means having a coupling and centering device for rigidly connecting the rotary drive to said wheel hub affixed to said axle and a chassis serving as a mobile carriage supporting the apparatus relative to the ground.

2. The apparatus of claim 1, comprising a refacing tool for each of two opposite sides of the disk, each of the refacing tools being positioned by a longitudinal drive means operable to move the tool parallel to the axle, and both said tools being positioned by a transverse drive means operable to move the tools along a line perpendicular to the axle.

3. The apparatus of claim 2, wherein said transverse drive means is electromotively operable in a radially outward direction relative to the axle.

4. The apparatus of claim 1, wherein the mounting means has two oppositely-directed coupling and centering devices mounted on opposite ends of the drive shaft, whereby the apparatus is connectable in mirror image to reface disks on opposite ends of the axle.

5. The apparatus of claim 4, wherein said tool carrier is moveable between two working positions at said opposite ends, belonging in each case to one of the coupling and centering devices.

6. The apparatus of claim 4, wherein said longitudinal carrier carries a mounting support for said drive shaft and provides a guide for said tool carrier extending beyond the mounting support.

7. The apparatus of claim 6, wherein said tool carrier has a longitudinal slide adjustably guided on said guide, an adjustable transverse carriage movable at right angles thereon and tool holders individually adjustable in the transverse direction.

8. The apparatus of claim 1, wherein the coupling and centering device is centered relative to the mounting means, whereby the coupling and centering device transmits the rotary drive and aligns the apparatus with respect to the axle.

9. The apparatus of claim 8, wherein the coupling and centering device has connection means aligned for a plurality of different wheel hubs.

10. The apparatus of claim 1, wherein the mounting means includes a longitudinal carrier connected to said chassis via means for adjusting said carrier in height and slope and pivoting said carrier, all with respect to said chassis.

11. The apparatus of claim 10, wherein said longitudinal carrier is pivotable for said slope adjustment about a pivot pin at right angles to said drive shaft and also pivotable about a pivot pin running parallel to said drive shaft.

* * * * *